Figure 7:
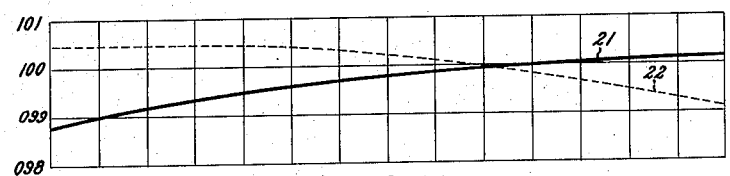

Aug. 23, 1938.  H. T. FAUS  2,128,131
LAG PLATE FOR WATT-HOUR METERS
Filed Feb. 25, 1937  3 Sheets-Sheet 1
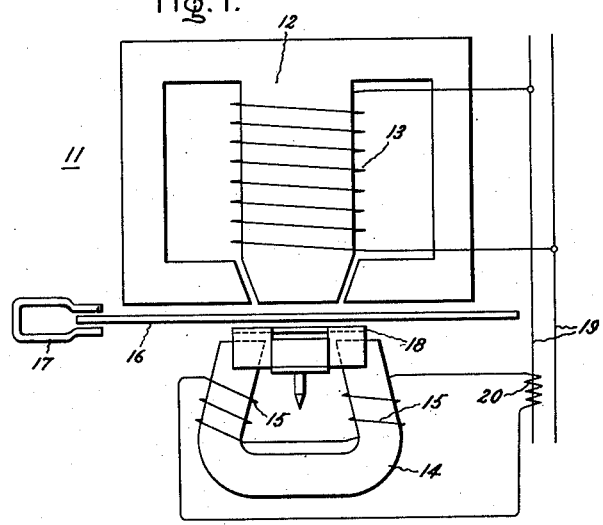
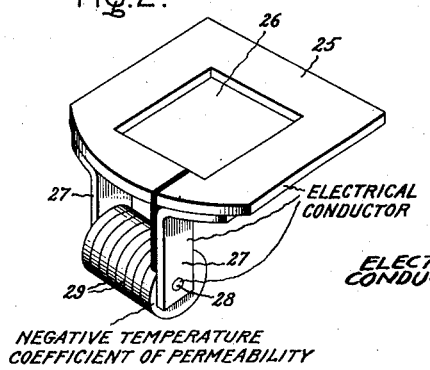
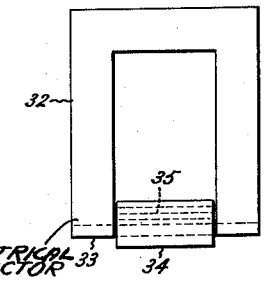
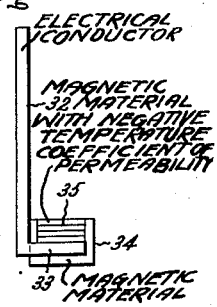
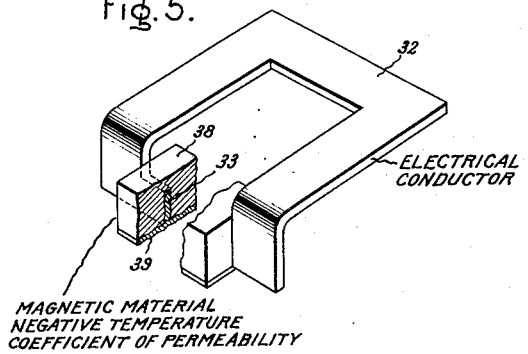
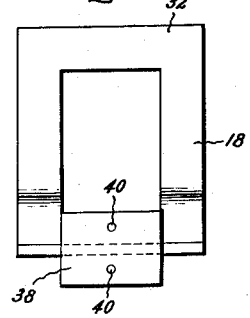
Inventor:
Harold T. Faus,
by Harry E. Dunham
His Attorney Inventor:
Harold T. Faus,
by Harry E. Dunham
His Attorney Patented Aug. 23, 1938

2,128,131

UNITED STATES PATENT OFFICE 2,128,131

LAG PLATE FOR WATT-HOUR METERS

Harold T. Faus, Lynn, Mass., assignor to General Electric Company, a corporation of New York Application February 25, 1937, Serial No. 127,657

5 Claims. (Cl. 171—264)

My invention relates to temperature compensation of electrical devices and circuits, such as meters, relays, measuring circuits, and the like. The invention is particularly useful in connection with alternating-current watt-hour meters for compensating such meters for a class of temperature errors which are pronounced at low power factors or vary with variations in power factor.

It is an object of my invention to provide improved compensation of temperature errors of the class dependent upon power factor.

It is a further object of my invention to provide temperature compensation which is substantially equally accurate at all temperatures within the range in which the apparatus is used.

Other and further objects and advantages will become apparent as the description proceeds.

Devices such as watt-hour meters, reactive component of power meters, induction relays, and other similar devices, comprising induction rotors and field elements for setting up magnetic fluxes to produce rotation of the rotors by electromagnetic induction, are subject to errors caused by variations in temperature. As pointed out by Isaac F. Kinnard in his Patent No. 1,706,171, these errors may be divided into two classes. The errors of the first class are substantially independent of variations in power factor of the load measured or responded to by the device, and the errors of the second class depend upon the power factor. The errors of the first class result largely from changes in the driving torque flux and in the drag or damping magnet flux produced by such causes as variations in the strength of the magnets with changes in temperature and, therefore, are not affected by changes in power factor. The errors of the second class, however, result from the fact that, as the power factor of the ordinary rotating induction device decreases from unity, there occurs, as explained in my Patent No. 2,050,881, an erroneous shifting of the phase relation between the current coil flux and the potential coil flux, which is due to the heating up of the potential winding and the lag plate and which may result in a decrease in the driving torque with temperature rise.

The present application is concerned only with errors of the class which are affected by variations in the power factor. Such errors will be referred to for convenience as Class II errors, and the type of compensation accomplished will be referred to as Class II temperature compensation.

In carrying out my invention in its preferred form, I employ a lag plate composed of a closed loop of electrically-conducting material having a reactance integral therewith and, to form the reactance, I provide a magnetic circuit member linking the electric circuit member and composed of different portions magnetically in series, at least one of which is composed of a material having a negative temperature coefficient of magnetic permeability. The relationship between the reluctances of the portions of the magnetic circuit member is so chosen that the effect of temperature variation at various temperatures is equalized and the lag plate produces substantially the same temperature correction at all temperatures within the range of the apparatus.

Figure 8:
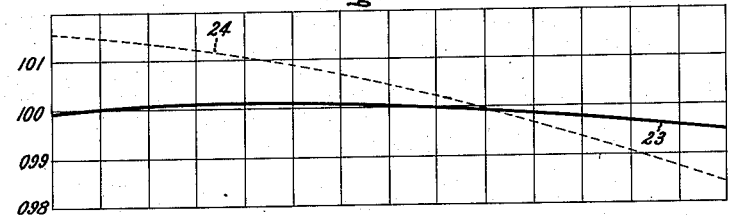
Figure 9:
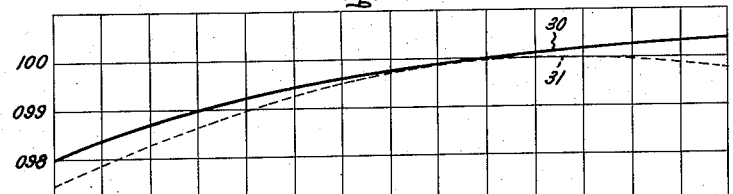
Figure 10:
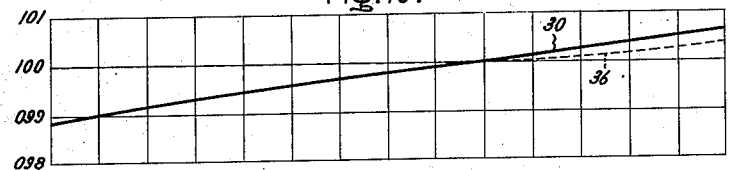
Figure 11:
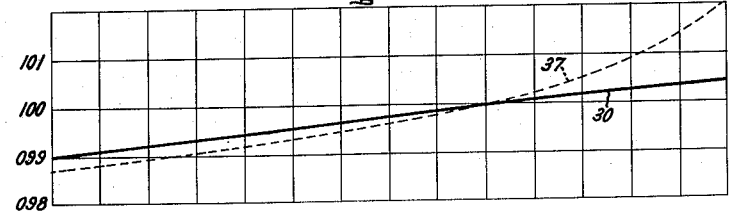
Figure 12:
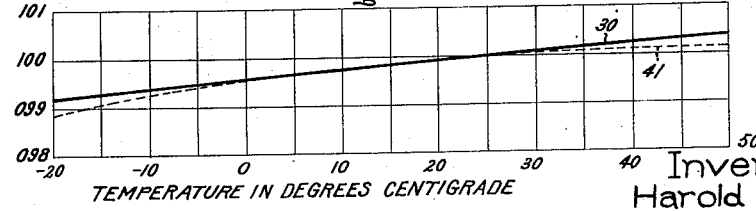
Figure 13:
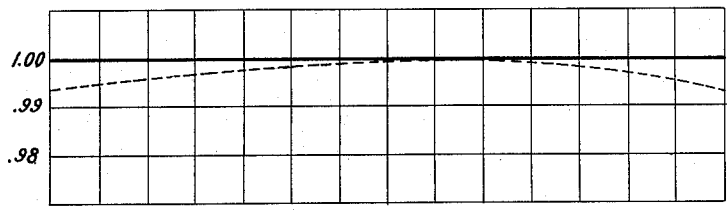
Figure 14:
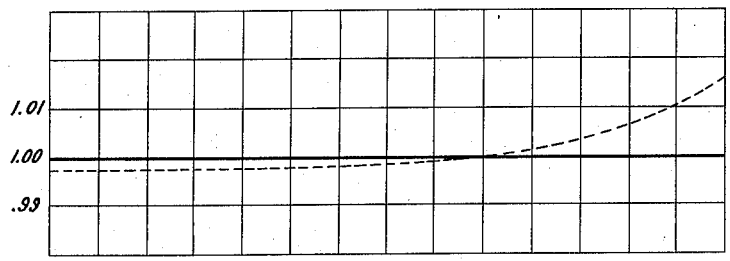
Figure 15:
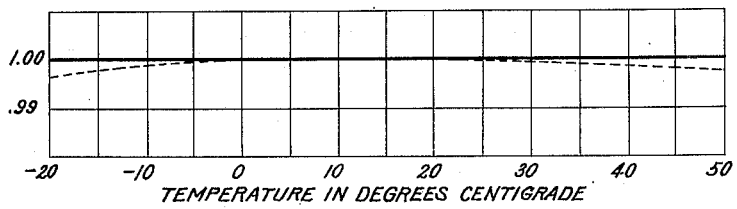
Figure 16:
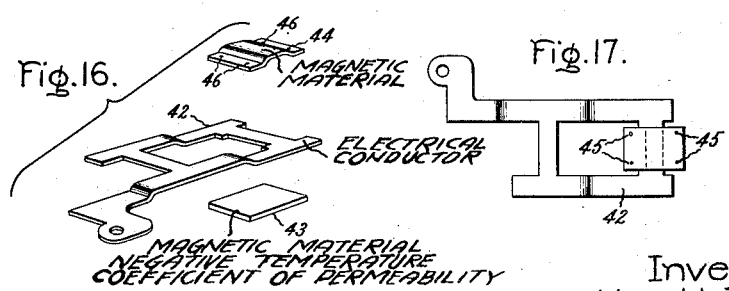
Figure 17:
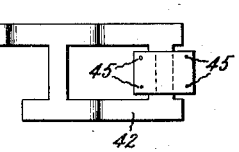

The invention may be understood more readily from the following detailed description when considered in connection with the accompanying drawings and those features of the invention which are believed to be novel and patentable will be pointed out in the claims appended hereto. In the drawings, Fig. 1 is a schematic diagram of a watt-hour meter incorporating an embodiment of my invention; Fig. 2 is a perspective view of a form of lag plate which I have found suitable when approximate Class II temperature compensation is satisfactory or when the range of temperature variation to which the apparatus may be subjected is relatively small; Figs. 3 and 4 are plan and side views, respectively, of a modified form of lag plate; Fig. 5 is a perspective view with a portion broken away of a lag plate construction designed to produce substantially uniform Class II temperature compensation at all temperatures; Fig. 6 is a bottom view of the lag plate shown in Fig. 5; Fig. 7 is a graph illustrating the relationship between accuracy and temperature at two different power factors of a meter not provided with Class II temperature compensation and adjusted to be nearly accurate at some average value of power factor between 50 per cent lagging and unity; Fig. 8 is a graph corresponding to the graph of Fig. 7 representing the characteristics of a meter provided with temperature compensation for those errors which are independent of variations in power factor and adjusted for maximum accuracy at unity power factor; Fig. 9 is a graph illustrating the characteristics of a watt-hour meter provided with compensation for temperature errors of the type dependent upon variations in power factor, the compensation being obtained by means of a lag plate such as that illustrated in Fig. 2; Figs. 10 and 11 are graphs corresponding to Fig. 9 illustrating the characteristics obtained by means of modified lag plates of the type illustrated in Fig. 3; Fig. 12 is a graph corresponding to Figs. 9 to 11, illustrating the characteristics obtained by utilizing a lag plate constructed in accordance with the preferred embodiment of my invention; Figs. 13, 14, and 15 are correction curves derived from the accuracy curves of Figs. 9, 11, and 12, respectively; Fig. 16 is an exploded perspective view of a modified lag plate construction; and Fig. 17 is a bottom view of the construction of Fig. 16. Like reference characters are utilized throughout the drawings to designate like parts.

My invention is illustrated as being applied to a watt-hour meter 11, represented in Fig. 1 of the drawings, comprising a potential core 12 carrying a potential winding 13, a current core 14 carrying a current winding 15, a rotatable disk 16, a drag magnet 17, and an adjustable lag plate 18. The potential winding 13 is connected across an electrical circuit 19 in which power consumption is to be measured, and the current winding 15 is connected in series with the circuit 19 through a current transformer 20.

In a watt-hour meter not provided with Class II temperature compensation, there will be different curves expressing the relationship between the ratio of the meter reading to true watt hours and temperature at different values of power factor. As illustrated in Fig. 7, the accuracy-temperature curve 21 at one hundred per cent power factor is a rising curve and the accuracy curve 22 at fifty per cent power factor lagging (shown dotted) is a curve descending with increased temperature. By means of Class I temperature compensation, that is, compensation of the relationship between driving torque and damping torque at different temperatures as taught, for example, in Kinnard Patent No. 1,706,161, the one hundred per cent power factor accuracy temperature curve may be leveled to produce the substantially horizontal curve 23 shown in Fig. 8. Such correction, however, maintains substantially the same relationship between the one hundred per cent power factor and the fifty per cent power factor curves, and the effect is substantially that of rotating the curves of Fig. 7 about their intersection so that, at fifty per cent power factor, the meter still reads too high at low temperatures and too low at high temperatures but the error is increased as shown by the dotted curve 24.

From the foregoing, it will be seen that, in order to overcome Class II errors, it would be desirable to make the accuracy curves for one hundred per cent power factor and for lower power factors substantially coincident, and that the criterion of the degree of Class II temperature compensation obtained is not the actual slope of the accuracy curve for a lower power factor, but the conformity which can be obtained between the low power factor accuracy-temperature curves and the one hundred per cent power-factor accuracy-temperature curve.

In my Patent No. 2,050,881, I describe a type of lag plate for obtaining Class II temperature compensation and I illustrate two different constructions in Figs. 2 and 3. Fig. 3 of my patent corresponds in form, although not in composition of material, to Fig. 2 of the present application. Although there is a similarity of superficial appearance between Figure 2 of my patent and Figure 5 of my present application there is an important difference in construction which I shall later point out. In the construction of Fig. 2 of this application, the lag plate consists of a sheet of metal 25 with the center 26 removed, angle pieces 27, and a rod 28 forming a closed loop of electrically-conducting material, linking a magnetic circuit member comprising a plurality of washers or pierced disks 29 composed of material having a negative temperature coefficient of magnetic permeability and having a composition of approximately twenty-nine and five-tenths per cent nickel, and seventy and five tenths per cent iron. It will be observed that the magnetic circuit in this case consists entirely of nickel alloy and, of course, the entire magnetic circuit of the magnetic circuit member has a negative temperature coefficient of magnetic permeability. By the use of such a lag plate, I succeeded in materially reducing the Class II errors as will be seen by comparison of Figs. 7 and 8 with Fig. 9, in which the heavy line 30 represents the accuracy temperature curve at one hundred per cent power factor and the dotted line 31 represents the accuracy temperature curve at fifty per cent lagging power factor. It will be understood that the curves of Figs. 9 to 12 inclusive do not show the correction for Class I compensation. It will be observed that the meter is slightly overcompensated at low temperatures and slightly undercompensated at high temperatures, as the dotted curve does not conform exactly to the full line curve, although it conforms much more nearly thereto than in Figs. 7 and 8. In using the terms "overcompensation" and "undercompensation" for Class II errors, I have in mind a comparison with the condition of Fig. 7, in which the unity and fifty per cent lagging power factor curves cross. From this view point the low temperature end of the dotted curve 31 in Fig. 9 represents over compensation because the dotted curve has been moved too far to make it conform to the full line curve 30. Similarly the high temperature end of the dotted curve 31 represents undercompensation because it has not been moved far enough to conform to the full line curve as compared with the condition in Fig. 7. If further improvement is attempted, any change which will increase or decrease the compensation equally at all points on the accuracy temperature curve will improve the accuracy at one temperature and make it worse at some other temperature. The dotted curve 31 in Fig. 9 is concave downward and I have found that its shape indicates that the rate of change of magnetic permeability at low temperatures is too great in comparison with the rate of change of magnetic permeability at high temperatures to accomplish accurate compensation throughout the temperature range.

In order to make the rate of change at high temperatures somewhat greater in comparison with the rate of change at low temperatures, I may introduce in the magnetic circuit member a certain amount of reluctance which remains relatively constant during temperature change. For example, I may utilize the construction of lag plate shown in Figs. 3 and 4 in which the electic circuit member consists of a sheet of copper 32 cut in the form of a hollow square with one side 33 bent down at right angles and in which the magnetic circuit member consists of a sheet of iron bent in the form of a U channel 34, the iron sheet being composed of a material having relatively little temperature variation in permeability, such as a material known by the trade name "Armco iron". The channel 34 is filled in with a plurality of laminations 35 of a material having a negative temperature coefficient of permeability, such as an alloy composed of 29.5 per cent nickel and the remainder iron.

Owing to the fact that a small air gap between the laminations 35 and the U channel 34 is inevitable, even though the pieces are very carefully fitted, it will be apparent that the reluctance of the magnetic circuit member consists of three parts in series, namely, the reluctance of the negative temperature coefficient of permeability material, the reluctance of the air gap, and the reluctance of the U channel. The latter two may be considered as one. Owing to the fact that the reluctance of the negative temperature coefficient of permeability material is relatively low at low temperatures and the reluctance becomes high at high temperatures (as the permeability falls off with temperature rise) and the reluctance of the air gap, of course, is constant regardless of temperature, the effect of the negative temperature coefficient of permeability material is greater at high temperatures and the presence of the air gap decreases the rate of change of reluctance with respect to temperature at low temperatures in comparison with the rate of change of reluctance at high temperatures. An accuracy temperature curve obtained from a watt-hour meter having a lag plate constructed as shown in Fig. 3 with four negative temperature coefficient of permeability laminations is shown by the dotted line 36 in Fig. 10. It will be seen that, under this condition, the meter is undercompensated at both low and high temperatures.

In order to obtain full compensation at low temperature, two additional laminations of negative temperature coefficient of permeability material may be placed in a U-channel member, and the resultant accuracy temperature curve 37 is shown in Fig. 11. It will be seen that the compensation is nearly correct at low temperatures but that the meter is now highly overcompensated at high temperatures. Class II compensation correction curves, Figs. 13 and 14, may be derived from Figs. 9 and 11, respectively, by subtracting the values of the desired readings represented by the full line curves from the values of the actual 50 per cent power-factor readings represented by the dotted line curves. The correction curve for the lag plate of Fig. 2 represented by Fig. 13 is concave downward and the correction curve for the lag plate of Fig. 3 with six laminations represented by Fig. 14 is concave upward, indicating that the desired compensation is to be obtained by making the ratio between the rate of change of reluctance with respect to temperature at high temperature and the ratio at low temperature somewhat greater than that indicated in Fig. 13 and somewhat less than that indicated in Fig. 14. I increase the effect of the negative temperature coefficient of permeability material either by increasing its length with respect to the portion of the magnetic circuit member not varying in permeability with temperature, that is, with respect to the length of the air gap and the length of the U-channel member, or by decreasing the equivalent air gap.

For example, I may adopt a construction similar to that of Fig. 2 of my Patent No. 2,050,881. In the construction shown in Fig. 5 of the present application also, there is a block 38 slotted to receive the side 33 of the electrically-conducting sheet 32. The block 38 is composed of a negative temperature coefficient of permeability material having the same composition as the laminations in Figs. 3 and 4 and there is a plate 39 composed of Armco iron secured to the block 38. In order to reduce the effect of the air gap still further, I may spot weld the plate 39 to the block 38 at two points 40 on either side, as shown in Fig. 6. The spot welding partially eliminates the effect of the air gap but, owing to the fact that the weld is over such a small area, the adjacent iron or alloy portions tend to saturate and the effect is the equivalent of the actual retention of a very small air gap. However, the construction differs from that of my patent in that I limit the welding to a very small area in order to avoid obtaining the effect of an integral magnetic circuit member without any air gap.

The accuracy temperature curve with the lag plate of Fig. 5 is shown by the dotted line 41 in Fig. 12. It will be seen that substantially correct compensation is obtained at all temperatures from twenty degrees below zero to fifty degrees above zero centigrade, and that the correction curve, Fig. 15, derived from Fig. 12 is practically level and straight without appreciable concavity either upward or downward. In the constructional embodiment of my invention illustrated in Fig. 5, at twenty degrees centigrade and with normal flux produced by the potential coil 13, the reluctance due to the block 38 represents approximately thirty per cent of the total magnetic reluctance of the magnetic circuit member of the lag plate, the reluctance due to the plate 39 represents approximately ten per cent of the total reluctance, and the reluctance due to the air gap and the magnetically saturated metal at the spot welds 40 represents the remainder of the reluctance. As a result of the effective air gap, the rate of change of total reluctance with respect to temperature is substantially equalized at various temperatures.

Although I have found the construction of Fig. 5 to be satisfactory, it will be understood that this construction is only illustrative and that the desired relationship between the rate of change of reluctance with respect to temperature at high and low temperatures may also be obtained by other constructions. For example, my invention may be carried out in the construction illustrated in Figs. 16 and 17. The electric circuit member consists of a sheet 42 and the magnetic circuit member consists of a plate 43 composed of a material having negative temperature coefficient of magnetic permeability, such as an iron alloy containing 29.5 per cent nickel, and a cap or strap 44 composed of Armco iron spot welded to the plate 43 at the areas 45. Owing to the decreased relative length of the magnetic path comprising material having a negative temperature coefficient of permeability as compared with the construction of Fig. 5, the effective or equivalent air gap may be decreased by increasing the number and area of the spot welds.

The invention has been successfully carried out in the construction of Figs. 16 and 17 by making the plate 43 one-half inch square and eight hundredths inch thick, and by making the cap 44 one-half inch long, thirty-one sixty-fourths of an inch wide, of stock three hundredths of an inch thick with four buttons 46 four hundredths of an inch in diameter for forming the spot welds 45. With these dimensions the area of actual contact between the plate 42 and the cap 44 is only .00415 times the area of the abutting surfaces and the length of the reluctance path in the constant permeability material is about the same as that in the material varying in permeability with temperature. Consequently, the quotient of the ratio of the area of contact of the two materials to the area of the abutting surfaces divided by the ratio of the reluctance path in the constant permeability material to the length of the reluctance path in the temperature variable permeability material is approximately .004. In the case of the construction illustrated in Figure 5 the ratios are approximately .00201 and .408 respectively and the quotient is approximately .005.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. A lag plate for alternating-current watt-hour meters comprising in combination, an electric circuit member comprising relatively rigid electrically-conducting material formed as a closed loop and a magnetic circuit member carried by said electric circuit member and substantially surrounding a portion thereof, said magnetic member comprising a portion composed of a material having a negative temperature coefficient of permeability and the remaining portion magnetically in series therewith composed of a different material, and including a section which is saturated, the relative ratios of length to transverse area of the magnetic circuit of the portions of the magnetic circuit member being such that the reluctance of the negative-temperature-coefficient-of-permeability portion is approximately 30 per cent of the total reluctance of the magnetic circuit member at 20 degrees centigrade.

2. A lag plate for an alternating-current watt-hour meter comprising in combination, an electric circuit member comprising electrically-conducting material formed as a closed loop and a magnetic circuit member linking said electric circuit member, said magnetic circuit member including a portion composed of a material having a negative temperature coefficient of magnetic permeability and another portion magnetically in series therewith composed of a different material, and including a section which is saturated, the relative ratios of length to transverse area of the magnetic circuit of the portions of the magnetic circuit member being such that the reluctance of the negative-temperature-coefficient-of-permeability portion is less than .6 of the total reluctance of the magnetic circuit member at 20 degrees centigrate.

3. An induction device having current and voltage electromagnets, a disk of conducting material rotatively mounted between said electro-magnets and acted upon by the fluxes of said electro-magnets, and a lag plate between said electro-magnets for obtaining a desired phase relationship between the fluxes produced by the different electromagnets, said lag plate comprising a closed loop of electrically-conducting material linking a magnetic circuit member including a portion having a negative temperature coefficient of magnetic permeability and another portion composed of a different material and including a section which is saturated, the relative ratios of length to transverse area of the magnetic circuit of said portions being such as to make the reluctance of the negative-temperature-coefficient-of-permeability portion sufficiently small in relation to the reluctance of the magnetic circuit member as a whole to keep the rate of change of reluctance with temperature of the magnetic circuit member substantially the same at different temperatures within the range of the apparatus.

4. A lag plate for an alternating current watt-hour meter comprising in combination, an electric circuit member composed of electrically conducting material formed as a closed loop and a magnetic circuit member linking said electric circuit member and including two pieces joined and magnetically in series with abutting surfaces, one piece being composed of a material having a magnetic permeability varying with temperature and the other piece being composed of a material having substantially constant magnetic permeability, the actual area of contact of the two pieces being a small fraction of the abutting surfaces of said pieces.

5. A lag plate for an alternating-current watt-hour meter comprising in combination, an electric circuit member comprising electrically-conducting material formed as a closed loop and a magnetic circuit member linking said electric circuit member including a portion composed of a material having a negative temperature coefficient of magnetic permeability and another portion magnetically in series therewith composed of a material having substantially constant magnetic permeability, the two portions being joined with abutting surfaces, only limited portions of which are actually in contact, the quotient of the ratio of the area of contact of the two materials to the area of the abutting surfaces divided by the ratio of the reluctance path in the substantially constant permeability material to the length of the reluctance path in the temperature variable permeability material being within the range from .002 to .007.

HAROLD T. FAUS.